United States Patent [19]

Stöldt et al.

[11] Patent Number: 4,559,884
[45] Date of Patent: Dec. 24, 1985

[54] HOLLOW THREAD BUNDLE AND METHOD OF ITS MANUFACTURE

[75] Inventors: August Stöldt, Volkmarsen; Heinz Stemig, Erkrath; Hans-Günther Breidohr; Manfred Martin, both of Wuppertal, all of Fed. Rep. of Germany

[73] Assignee: Akzo NV, Arnhem, Netherlands

[21] Appl. No.: 440,023

[22] Filed: Nov. 8, 1982

[30] Foreign Application Priority Data

Nov. 11, 1981 [DE] Fed. Rep. of Germany ....... 3144813

[51] Int. Cl.⁴ .................. D05B 97/00; D05B 93/00; D02G 3/00
[52] U.S. Cl. .................. 112/262.1; 112/412; 428/394; 428/364; 57/243
[58] Field of Search .............. 112/262.1, 412, 440, 112/441, 438; 428/394, 300, 364, 373; 57/210, 243, 244, 908; 139/425

[56] References Cited

U.S. PATENT DOCUMENTS

| | | | |
|---|---|---|---|
| 711,898 | 10/1902 | Hyatt | 112/412 |
| 1,936,434 | 11/1933 | Jumonville | 112/412 X |
| 2,955,552 | 10/1960 | McGahee | 112/412 X |
| 2,961,738 | 11/1960 | Thomas | 112/412 X |
| 3,155,062 | 11/1964 | Westmijze et al. | 112/412 |
| 3,389,548 | 6/1968 | Lachaussee et al. | 57/244 |
| 3,390,602 | 7/1968 | Ohno | 112/412 X |
| 3,536,019 | 10/1970 | Honda et al. | 112/412 X |
| 3,672,148 | 6/1972 | Benson et al. | 112/412 X |
| 4,346,553 | 8/1982 | Schwartz | 57/210 |

*Primary Examiner*—H. Hampton Hunter
*Attorney, Agent, or Firm*—Michael J. Striker

[57] ABSTRACT

A hollow thread bundle for material and/or heat exchange has a plurality of substantially parallel hollow threads of substantially equal length, and a sewing seam wrapping around the plurality of hollow threads and including at least one sewing thread. The hollow thread bundle can be produced by wrapping the plurality of hollow threads by a sewing seam including at least one sewing thread.

16 Claims, 12 Drawing Figures

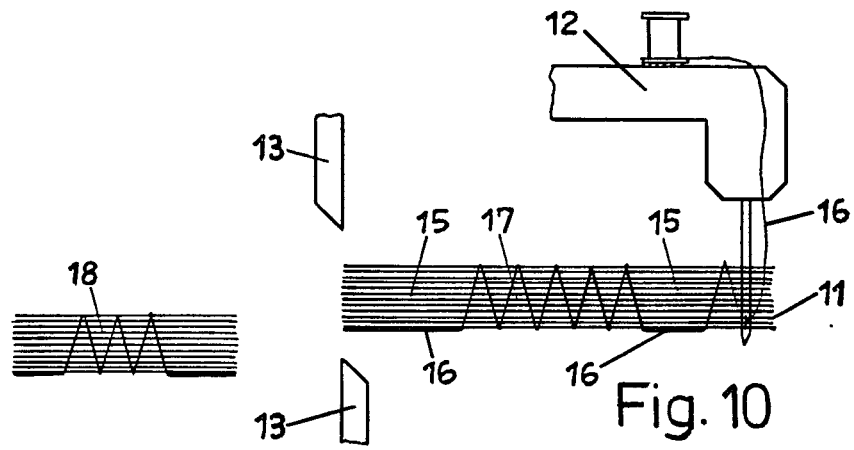
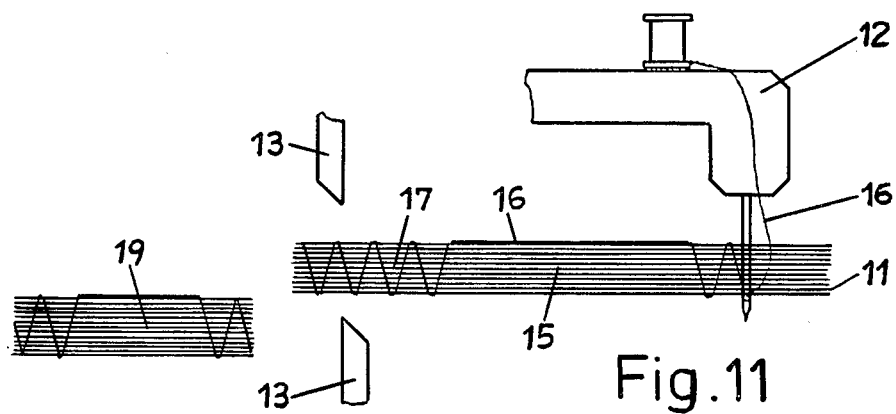
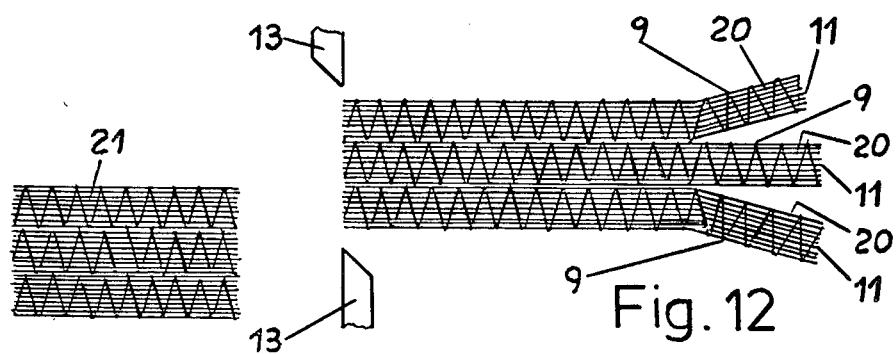

HOLLOW THREAD BUNDLE AND METHOD OF ITS MANUFACTURE

BACKGROUND OF THE INVENTION

The present invention relates to a hollow thread bundle for material and/or heat exchange, including a plurality of substantially parallel hollow threads of substantially equal length, and to a method of manufacturing the same.

Hollow thread bundles of the above-mentioned type are needed, for example, for a manufacture of heat exchangers and modules which are used, for example, in the following fields in plasmaphoresis in which blood plasma is separated from the cellular particles, in blood oxygenation, in microfiltration particularly cross-flow microfiltration, in dialysis, in reverse osmosis, and in ultrafiltration. These hollow thread bundles are produced by assembling a plurality of hollow threads and cutting them by length. Since the hollow threads run out of a hollow thread spinning machine with a speed which is very high for their handling by post working to hollow thread bundles, the hollow threads are first wound individually or in groups. From the thusproduced coils the hollow threads then form hollow thread bundles or packets. Hollow threads for the above-mentioned field of application are very sensitive, so that when the hollow threads are handled and wound in accordance with the known methods they are damaged.

SUMMARY OF THE INVENTION

Accordingly, it is an object of the present invention to provide hollow thread bundles and methods of manufacturing the same, which avoid the disadvantages of the prior art.

More particularly, it is an object of the present invention to provide hollow thread bundles and a method of manufacturing the same, in accordance with which the hollow threads exiting a hollow thread spinning machine can be immediately treated so as to form hollow thread bundles without an intermediate step, so that gentle treatment of sensitive hollow threads is guaranteed.

Still a further feature of the present invention is that to provide such hollow bundles which during their further treatment so as to form heat exchangers, modules, etc. are subjected to simple and gentle treatment.

In keeping with these objects and with others which will become apparent hereinafter, one feature of the present invention resides, briefly stated, in a hollow thread bundle which has a plurality of substantially parallel hollow threads of substantially equal length and are provided with a sewing seam which is wrapped around the hollow threads and includes at least one sewing thread.

The principles of the sewing technique which are used here are taken from the clothing dictionary, the publisher Wilfried Fhierbaum, Verlag Schiele and Schön, 1978.

Hollow threads which are suitable for the inventive hollow thread bundle can be composed of regenerated cellulose, for example regenerated from cellulose-cuoxam solution, of synthetic polymers such as polyamides, polycarbonates or polyurethanes, and also of porous polyamides, polyolefins and polyesters. The cross-section of the hollow threads can be circular. However, the cross-section can also have another shape, such as for example disclosed in the German Offenlegungsschriften Nos. 2,842,957, 2,842,958, 2,842,836 and 2,848,601. For the inventive hollow thread bundle also thin-walled hollow threads are suitable as disclosed in the German Offenlegungsschrift No. 2,856,123.

The invention goes from the assumption that the sewing stitch forming the sewing seam can be formed without sewing material. A sewing seam wraps around a hollow thread bundle when the sewing stitch is formed outside the hollow thread bundle. Several hollow thread bundles lying adjacent to one another can be wrapped in accordance with the invention with one sewing seam which also forms a sewing stitch between the individual hollow thread bundles.

In accordance with another advantageous feature of the present invention, the sewing threads and their interlaces are located outside of the hollow thread bundles.

In accordance with the above-mentioned clothing dictionary, the thread interlaces are interlaces carried out by stitch formation process and differing in dependence upon the stitch type, which are produced by loops or several sewing threads formed during sewing.

The sewing seam which wraps the hollow thread bundles can be composed of sewing threads arranged in a single chain stitch or of two sewing threads arranged in zig-zag double lock stitch.

A further feature of the present invention is that the sewing seam wrapping the hollow thread bundle can be composed of one, two or four sewing threads, when the sewing threads are arranged in an oversew chain stitch.

Further stitch types which are suitable for sewing the hollow thread bundle are known from the above-mentioned clothing dictionary, pages 268-272 or from the company perspectus of the sewing machine manufacturer. Only those stitch types are in question, in which the sewing stitch takes places outside of the hollow thread bundle and which wrap the hollow thread bundle around.

Sewing threads which form the sewing seam surrounding the hollow thread bundle can be endless thread, fiber yarns, or other suitable sewing threads or sewing yarns, which are manufactured from synthetic polymers are natural products. Also threads or hollow threads which are produced from the same materials from which the hollow thread bundle is produced, can be used as sewing threads.

The hollow thread bundle can be wrapped around over their entire length or only over one or several portions with the sewing seam. The best protection for the hollow thread bundle is provided by a sewing seam which wraps the hollow thread bundle over its entire length. When the hollow thread bundle is molded with its ends in a filling or sealing mass, it is advantageously wrapped around only on its portion provided for material and/or heat exchange. This means that both molded ends of the hollow thread bundle has no sewing seam, so that the above-mentioned mass can penetrate between the hollow threads. It can also be advantageous when only the end of the hollow thread bundles are sewn around. For saving the sewing threads, the hollow thread bundle can be wrapped around by sewing seam portions distributed over its length.

Still a further feature of the present invention is that several sewn around hollow thread bundles can be assembled so as to form a hollow thread packet.

In accordance with a further advantageous feature of the present invention, a method of manufacturing the hollow thread bundle includes providing a plurality of endless hollow threads in a substantially parallel arrangement, wrapping a hollow thread strand formed by the assembled hollow threads with at least one sewing thread or sewing yarn so that the sewing stitches are arranged outside of the hollow thread strand, and the sewn hollow thread strand is cut in hollow thread bundles of a predetermined length.

Since the sewing stitches are located outside of the hollow thread strand, damage to individual hollow threads is excluded. It is however advisable to use dull sewing needles in a sewing machine. In this way the service life of the sewing needle is increased. For sewing around of the hollow thread bundles all sewing machines in which sewing around is possible can be used, for example single thread sewing machines, zig-zag sewing machines, or winding stitch machines. Other machines which produce mesh of known stitch type can be used for sewing around the hollow thread bundle.

For manufacturing hollow thread bundles in which only a portion of their entire length are sewn around, the hollow thread strand runs through the sewing location with a constant speed and is intermittently sewn around. With the sewing seam-free portions of the hollow thread bundle, the sewing threads or the sewing yarns are pulled around parallel to the hollow threads. The sewing threads lying in the sewing seam-free portions on the hollow thread bundle can be left or removed in the finished bundle.

In dependence upon the type of the desired partial wrapping sewing seam, the hollow thread strand is cut in the sewing seam free portion or in the portion provided with the sewing seam.

Cutting of the hollow thread bundle is performed in dependence upon the speed of the running hollow thread strands and the required quality of the cut by a rotatable cutter, with the aid of small circular saws, an impact cutter, or laser beam.

When the hollow thread bundles are sewn by several hollow thread spinning machines, it is recommended that several sewn around hollow thread strands are pulled simultaneously, assembled in substantially parallel position, and cut to hollow thread packets in predetermined length.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 10 and 11 are views showing a method of manufacturing hollow thread bundles, in accordance with which the bundle is intermittently sewn around and cut in a seam-free portion or in a seamed portion, respectively; and FIG. 12 is a view schematically showing a method of manufacturing a hollow thread pocket.

DESCRIPTION OF THE PREFERRED EMBODIMENTS

Figure 1:
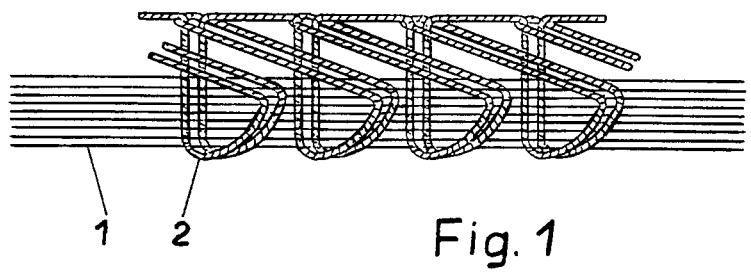
FIG. 1 is a view showing a hollow thread bundle wrapped by a sewing seam in accordance with the present invention.

FIG. 1 is a view showing a hollow thread bundle which is composed of a plurality of hollow threads 1 and wrapped by a sewing seam 2. The sewing seam is composed of a sewing thread which is arranged in a single chain stitch or stitch type 103. The sewing threads lying behind the hollow thread bundle in FIG. 1 are shown in broken lines. The hollow thread bundle can be composed, for example of two hundred forty hollow threads with an outer diameter of 200 micrometer and a wall thickness of 11 micrometer, with length of 250 millimeter.

Figure 2:
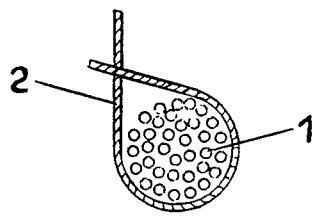
FIG. 2 is a view showing a cross-section of the hollow thread bundle of FIG. 1.

FIG. 2 shows a cross-section of the hollow thread bundle of FIG. 1 from which the position of the hollow thread bundle between the sewing thread can be clearly seen. The sewing stitch located outside of the hollow thread bundle is not shown for the sake of simplicity.

Figure 3:
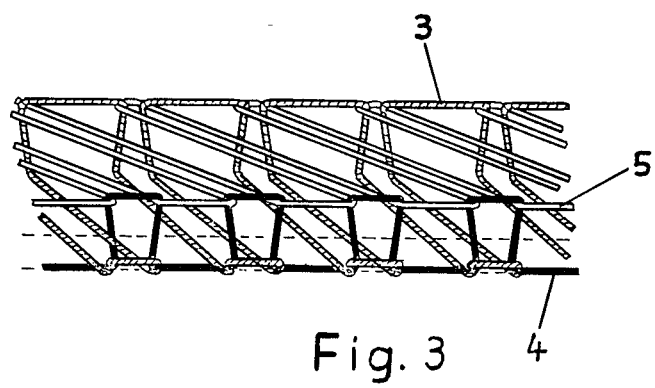
FIG. 3 is a view showing a three-threaded winding chain stitch (stitch type 505)

FIG. 3 shows a particularly suitable stitch type with a three-thread winding chain stitch or stitch type 505 and is composed of three sewing threads 3, 4 and 5. The thus-formed sewing seam is particularly suitable for wrapping the hollow thread bundle. The hollow thread bundle is not shown in FIG. 3.

Figure 4:
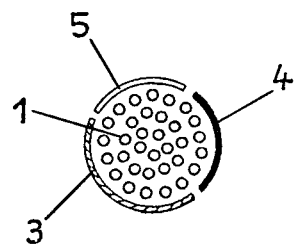
FIG. 4 is a view showing a cross-section of the hollow thread bundle sewn by the three-threaded winding chain stitch.

FIG. 4 schematically shows how the sewing threads 3, 4 and 5 with the three-thread winding chain stitch wrap the hollow thread bundle composed of the hollow threads 1. With the respective adjustment of the thread pulling force, the sewing threads 3, 4 and 5 can be arranged so that each sewing thread wraps approximately one-third of the hollow thread bundle. The thread pulling forces depend upon the type of the sewing machine, the machine itself and the utilized sewing thread type. In FIG. 4 the interlacing points of the individual sewing threads are not shown.

Figure 5:
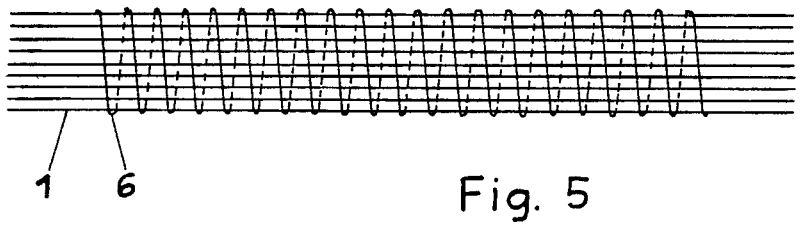
FIGS. 5, 6 and 7 are views showing further wrapping possibilities for the hollow thread bundle in accordance with the invention.

FIG. 5 shows a hollow thread bundle composed of a plurality of the hollow threads 1 which are wrapped around by a schematically shown sewing seam 6 over a portion used for material and/or heat exchange. Since both ends of the hollow thread bundle are free from the sewing seam, such a bundle is particularly suitable for molding the ends of the bundle by a respective molding or filling mass.

Figure 6:
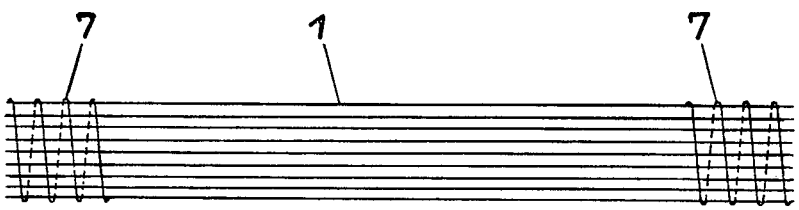

FIG. 6 shows a hollow thread bundle composed of a plurality of hollow threads 1 and wrapped by a schematically shown sewing seam 7 at its both ends. This hollow thread bundle can be molded, for example, in such a manner that both wrapped ends extend outwardly beyond the molding mass and are cut after hardening of the molding mass.

For limiting the sewing thread consumption, a sewing seam 8 of the hollow thread bundle composed of a plurality of the hollow thread 1 can be formed as several portions. Thereby, between two neighboring sewing seam portions, a sewing seam-free portion is provided. A hollow thread bundle with three sewing seam portions 8 is shown in FIG. 7.

Figure 7:
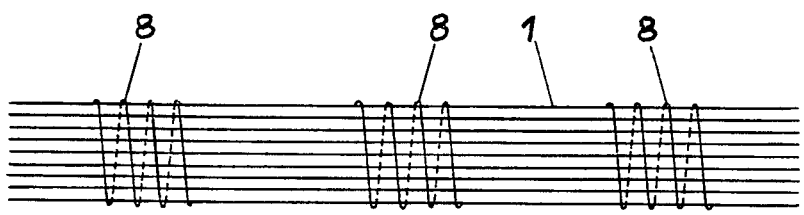

In FIGS. 5, 6 and 7 the sewing threads which extend substantially parallel in the sewing seam-free portions of the hollow thread bundles are not shown.

Figure 8:
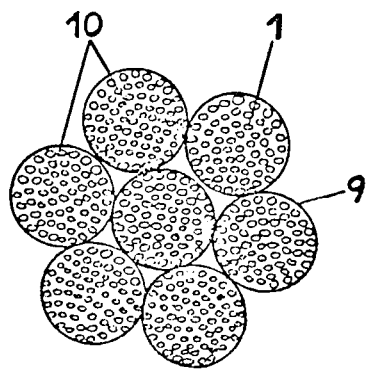
FIG. 8 is a view showing a cross-section of a packet with a plurality of hollow thread bundles formed in accordance with the inventive method.

FIG. 8 shows a packet which is composed of seven hollow thread bundles 10. Each hollow thread bundle 10 is composed of a plurality of the hollow threads 1 sewn around by a sewing seam 9.

Figure 9:
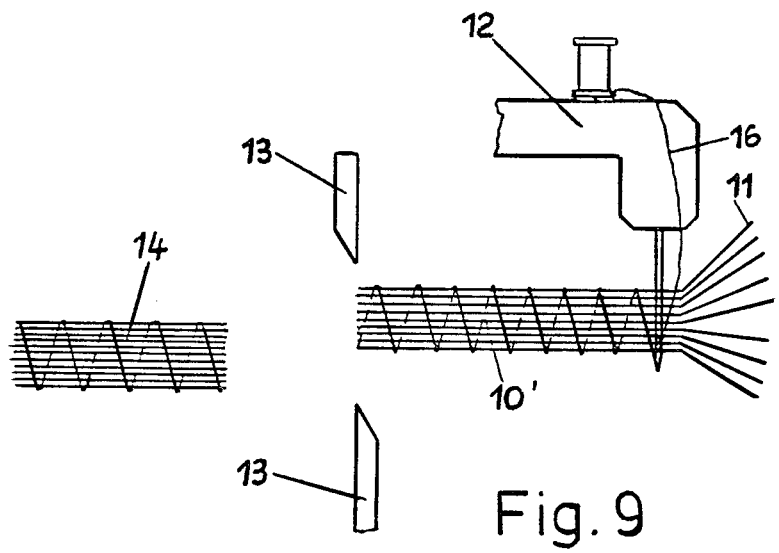
FIG. 9 is a view showing a method of manufacturing a hollow thread bundle.

FIG. 9 schematically shows a method of manufacturing of a hollow thread bundle 14. A plurality of endless hollow threads 11 are assembled and sewn around with the aid of a sewing machine 12 by a sewing seam 10'. A cutting device 13 cuts the hollow threads 1 wraped by the sewing seam 10' to a predetermined length to form the hollow thread bundle 14.

FIGS. 10 and 11 schematically show a method on accordance with which a hollow thread bundle composed of the hollow treads 11 is sewn around intermittently by a hollow thread 16. Here, a hollow thread strand is formed, which includes alternating portion 17 with the hollow thread strand provided with a sewing seam and a seam-free portion 15 in which the hollow thread 16 extends parallel to the main hollow threads. The hollow thread strand can be cut in the region of the seamfree portion 17 as shown in FIG. 10, or in the region of the portion 15 provided with the seam as shown in FIG. 11. Hollow thread bundles 18 and 19 are cut by the cutting device 13 to a certain length.

FIG. 12 shows a method of manufacturing of a hollow thread packet 21, in accordance with which a hollow thread strand 20 is composed of the hollow threads 11 and the sewing seam 9 wrapping the latter. The entire hollow thread packet 21 is cut to a certain length by the cutting device 13.

It will be understood that each of the elements described above, or two or more together, may also find a useful application in other types of constructions differing from the types described above.

While the invention has been illustrated and described as embodied in hollow thread bundles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

1. A hollow thread bundle element for material and-/or heat exchange, comprising
   a plurality of substantially parallel hollow threads having a substantially equal length and together forming a three-dimensional hollow thread bundle; and
   a sewing seam including at least one sewing thread and loosely wrapping said hollow threads around without passing through the hollow thread bundle or deforming the latter so as to prevent damaging to or cross-section reduction of the hollow threads which can otherwise result in rejection or output decrease of the bundle element.

2. A hollow thread bundle element as defined in claim 1, wherein said sewing seam is arragned so that it is located outside of said plurality of hollow threads.

3. A hollow thread bundle element as defined in claim 2, wherein said sewing seam includes a plurality of interlaces located outside of said plurality of hollow threads.

4. A hollow thread bundle element as defined in claim 3, wherein said sewing thread of said sewing seam is arranged in a single chain stitch.

5. A hollow thread bundle element as defined in claim 1, wherein said sewing seam which wraps said plurality of hollow threads includes two sewing threads arranged in a zig-zag double lock stitch.

6. A hollow thread bundle element as defined in claim 1, wherein said sewing seam which wraps said plurality of hollow threads includes four sewing threads arranged in an oversew chain stitch.

7. A hollow thread bundle element as defined in claim 1, wherein said sewing seam wraps said plurality of hollow threads over their entire length.

8. A hollow thread bundle element as defined in claim 1, wherein said plurality of hollow threads has a portion arranged for material and/or heat exchange, said sewing seam wrapping said portion of said plurality of hollow fibers.

9. A packet including a plurality of hollow thread bundles elements formed in accordance with claim 1.

10. A method of producing a hollow thread bundle element; comprising the steps of
    providing a plurality of substantially parallel hollow threads having a substantially equal length and together forming a three-dimensional hollow thread bundle; and
    loosely wrapping around the plurality of hollow threads by a sewing seam including at least one sewing thread and without passing through the hollow thread bundle or deforming the later so as to prevent damaging to or cross-section reduction of the hollow threads which can othersiwe result in rejection or output decrease of the bundle element.

11. A method as defined in claim 10, wherein said wrapping step includes wrapping the bundle of the endless hollow fibers so that a sewing stitch is located outside of the bundle; and further comprising the step of cutting the sewn strand of the endless hollow fibers.

12. A method as defined in claim 11, wherein said wrapping step includes sewing around the bundle by the sewing seam intermittently over portions of the length of the hollow threads, and moving the bundle through a sewing location with a constant speed.

13. A method as defined in claim 12, wherein said wrapping steps include wrapping the bundle so as to provide a seamless portion, said cutting step including cutting in the seamless portion of the bundle.

14. A method as defined in claim 13, wherein said wrapping step include wrapping the bundle so as to form the strands a portion provided with the seam, said cuting step including in the bundle portion provided with the seam.

15. A method as defined in claim 14, wherein said providing and wrapping steps include forming a plurality of such wrapped bundles; and further comprising the steps of arranging said bundles in a mutually parallel position, said cutting step including cutting the parallel bundles.

16. A method as defined in claim 15, where said wrapping step includes sewing around the bundle by the sewing seam continuously over the entire length of the hollow threads.

* * * * *